Patented Sept. 11, 1934

1,973,488

UNITED STATES PATENT OFFICE 1,973,488

LACQUER

Neil S. Kocher, Rochester, N. Y., assignor to Eastman Kodak Company, Rochester, N. Y., a corporation of New York No Drawing. Application May 29, 1930, Serial No. 457,505

5 Claims. (Cl. 91—68)

This invention relates to protective coverings for metal, wood, etc., such as automobile bodies, fenders and hoods, furniture, etc., and more particularly to a lacquer used to create protective coatings or coverings composed of a plurality of layers of cellulose derivative lacquer such as a cellulose acetate lacquer overcoating and one or more cellulose nitrate undercoatings.

In an application of Paul C. Seel, Serial No. 425,353, filed February 1, 1930, there is disclosed the broad conception of a cellulose acetate lacquer overcoating superimposed upon one or more coatings of cellulose nitrate lacquer, the cellulose acetate lacquer overcoating having the function of protecting the cellulose nitrate lacquer undercoating from the elements, and as the cellulose acetate lacquer is more durable and maintains a gloss for a longer period of time than does cellulose nitrate lacquer, it makes a highly desirable finish coating.

In my application Serial No. 444,874, filed April 16, 1930, I disclose that better results can be obtained if the cellulose acetate lacquer overcoating is not superimposed directly over the usual cellulose nitrate lacquer undercoating, but that it is more advantageous to employ in addition an intermediate coating of clear cellulose nitrate solution (free from resins and pigments) to shield the cellulose acetate overcoating from the usual cellulose nitrate undercoating which contains resins and other addition compounds that cause the cellulose acetate overcoating to sometimes blister and peel after relatively short exposure, thus obtaining a more durable protective covering which does not so readily decompose or otherwise deteriorate.

It is, of course, disclosed in both of the above applications that the usual plasticizers known to the art may be employed in the cellulose acetate lacquer overcoating, as well as in the undercoatings employed. I have discovered, however, that in employing certain of the usual plasticizers in the cellulose acetate lacquer overcoating that the coating will, upon exposure to the usual elements, often become badly discolored in a relatively short time due to decomposition of the plasticizer which is incorporated in the lacquer. Not only does this occur, but the cellulose nitrate lacquer undercoating will likewise become discolored due to decomposition of the cellulose nitrate and of certain of the elements incorporated in the cellulose nitrate lacquer by the ultraviolet light of short wave length which penetrates through the overcoating to the undercoating.

Staud and Richardson in their application Serial No. 410,708, filed November 30, 1929, and in their application Serial No. 457,508 filed of even date herewith, disclose that certain compounds, such as naphthalene, chloronaphthalene, anthracene, phenanthrene, etc., may be incorporated in the cellulose acetate lacquer overcoating in small proportions to shield the cellulose nitrate lacquer undercoating from the deteriorating effect of the ultra-violet rays of light of short wave length which would otherwise, at least to a considerable extent, pass through the cellulose acetate lacquer overcoating. In other words, the substances added by Staud and Richardson to the acetate lacquer overcoating are added in small amounts for the purpose of absorbing the ultra-violet rays of the spectrum which have a sufficiently short wave length to decompose or deteriorate the cellulose nitrate undercoating.

I have discovered several compounds which may be made to serve the double function of an ultra-violet light filter and a plasticizer in the cellulose acetate lacquer overcoating for absorbing ultraviolet light rays having a wave length shorter than about 320 millimicrons which would otherwise penetrate to and deteriorate or decompose the nitrate lacquer undercoating. In addition I have discovered that the majority of these compounds will not decompose or otherwise change their composition into compounds that discolor substantially the cellulose acetate lacquer coating itself; this is a particularly notable discovery in view of the fact that, although hundreds of plasticizers have been suggested and used in cellulose acetate compositions, few will withstand the deteriorating action of long exposure to ultra-violet light, at least in plasticizing amounts, without becoming substantially discolored and thus discoloring the composition itself. In this application I have claimed a cellulose acetate lacquer which comprises a compound incorporated in plasticizing amounts and which compound does not decompose into any discoloring compound; certain of the claims also include the function that the plasticizing compound absorbs ultra-violet light.

I have also discovered that there may be combined in the cellulose acetate lacquer overcoating two or more different compounds which have distinct functions, namely, one compound which acts as a plasticizer and does not decompose to discolor the cellulose acetate lacquer, and another compound which prevents decomposition and discoloration of the cellulose nitrate lacquer undercoating; in this instance the light filter composition may be added in small amounts and the composition which plasticizes and negatives discoloration of the acetate lacquer be added in amounts large enough to serve as a plasticizer.

It is, therefore, among the objects of my invention to provide a cellulose acetate lacquer overcoating which will not itself discolor and to alternatively or at the same time provide such an acetate overcoating which will also shield a cellulose nitrate undercoating over which it is superimposed from the deleterious action of the ultra-violet light rays which are of sufficiently short wave length to decompose and deteriorate the cellulose nitrate undercoating. It is further among the objects of my invention to add certain compounds to cellulose acetate lacquer overcoatings in such proportions as to properly plasticize the lacquer (whether or not it decomposes to discolor the lacquer) and which, at the same time, shield the cellulose nitrate undercoating from ultra-violet rays of relatively short wave length or which by the addition of others perform that function. It is also among the objects of my invention to provide a cellulose acetate composition which has added thereto certain compounds which do not decompose to discolor the cellulose acetate composition itself. Numerous other objects will become apparent to those skilled in the art upon a perusal of this specification.

I have found, for instance, that a cellulose acetate composition, such as a lacquer, which when exposed to ultra-violet light and other of the elements will not discolor to any substantial extent, can be produced by compounding it in the usual manner for such lacquers except that as a plasticizer I employ one or more of the following compounds in amounts of from approximately 10 to 70 percent of the weight of the cellulose acetate used, such compounds being benzyl acetate, glyceryl butyl phthalate, beta-methoxy-ethyl-phthalate, phenyl benzoate, benzyl benzoate and the like which compounds do not decompose upon exposure to ultra-violet light into ones that are discolored to any substantial extent. Due to its tendency to crystallize out upon coagulation of the lacquer, phenyl benzoate is not usually satisfactorily employed in amounts in excess of about 40% and if greater plasticity is desired, it may be necessary to add a small proportion of one or more of the other compounds named.

These compounds are efficient in lacking discoloration upon exposure in the cellulose acetate lacquer in approximately the order named, that is, benzyl acetate is probably the most efficient of the compounds named, while the other compounds are substantially as efficient as benzyl acetate.

I have furthermore found that all of these same compounds are also quite effective for preventing decomposition and discoloration of a cellulose nitrate solution or lacquer undercoating, over which such an acetate lacquer may be superimposed, if employed in plasticizing amounts, for instance, in excess of 10 percent, the effect of an overcoating containing these compounds being to absorb the ultra-violet light which causes rapid discoloration and deterioration of a cellulose nitrate layer otherwise unprotected. To serve this same function one may also employ ethyl acetanilid in similar amounts except that ethyl acetanilid has the effect upon exposure to ultra-violet light of itself discoloring the cellulose acetate lacquer somewhat: therefore, if it should be important to avoid discoloration of the cellulose acetate layer it is not as desirable to employ ethyl acetanilid.

A representative formula for compounding such a cellulose acetate lacquer suitable for overcoating is as follows: 20 ounces of acetone soluble cellulose acetate are mixed with from 2 to 14 ounces of any of the above named compounds (except that not more than about 8 ounces or about 40% of phenyl benzoate should be employed), such other resins and suitable addition agents as may be required or desired being also added thereto. This mixture is then dissolved to the finished gallon in a quantity of solvent composed of approximately 15 percent ethyl acetate, 50 percent acetone, 20 percent ethyl lactate, and 15 percent denatured alcohol.

I have also discovered that the compounds benzyl-benzoate, glycerol butyl phthalate, and beta-methoxy-ethyl-phthalate have the effect of absorbing ultra-violet light, if incorporated in the cellulose acetate overcoating, in amounts as small as 3 percent or even less. While employing any one of these three compounds in the cellulose acetate overcoating as light filters to prevent the ultra-violet light from deteriorating the cellulose nitrate undercoating, it is also preferable to add some plasticizing compound for the acetate such as some other of those which I have named above, namely, benzyl acetate, glyceryl butyl phthalate or beta-methoxy-ethyl phthalate, phenyl benzoate, benzyl benzoate, which plasticizing compounds at the same time will not decompose and discolor the cellulose acetate, although it will be obvious that if discoloration of the cellulose acetate is not material other plasticizers may be employed. I may also desire to employ a relatively small percentage of phenyl benzoate as the ultra-violet light filter, such as approximately 10 to 15 percent thereof, and to employ from 10 to 80 percent of a compound such as benzyl acetate as the plasticizer for the lacquer. A typical example employing glycerol butyl phthalate as the ultra-violet light filter wtih a plasticizer would be approximately ½ of 1 ounce of glycerol butyl phthalate, 9 ounces of benzyl acetate and 20 ounces of cellulose acetate, this mixture being dissolved to make 1 gallon in the above-mentioned solvent mixture. A typical example for a phenyl benzoate formula employed as described would be 20 ounces of cellulose acetate, 3 ounces of phenyl benzoate and 9 ounces of benzyl acetate in one gallon of the above-named solvent. All of the percentages mentioned above are, of course, based upon the weight of the cellulose acetate, that is, when 10 percent is referred to, I intend that 10 parts of the compound shall be added to 100 parts of cellulose acetate or in that ratio:

In this same manner I may employ as the ultra-violet light filter any of the compounds mentioned in the Richardson and Staud application Serial No. 457,508 filed of even date, and in addition thereto add any suitable plasticizer which will not discolor the cellulose acetate itself upon exposure, such, for instance, as those compounds named above for that purpose. For instance, approximately ½ of 1 ounce of either naphthalene, monochlor-naphthalene, anthracene, phenanthrene or diphenylbenzene may be mixed with about 9 ounces of either phenyl benzoate, benzyl acetate, benzyl benzoate, glycerol butyl phthalate or beta-methoxyethyl-phthalate or other suitable plasticizer, added to about 20 ounces of cellulose acetate and dissolved to a finished gallon in a suitable quantity of the above named solvent combination or other solvent to give a well plasticized cellulose acetate lacquer which will not appreciably discolor and which will prevent the cellulose nitrate undercoating from discoloring or deteriorating. Instead of the above named ultra-violet light filters a similar quantity of diphenyl guanidine, aminobenzoic acid, phthalimide, nitroanisole, nitrobenzol, or the like, described in applications of Murray, Richardson and Staud Serial Nos. 457,511; 457,510; 457,509, respectively; filed of even date, may be employed. Furthermore, I may employ with a number of non-discoloring plasticizers for cellulose acetate, a small percentage of ortho, meta or para diphenyl benzene (hereinafter referred to merely as diphenyl benzene (which acts as an ultra-violet light filter for protecting the cellulose nitrate lacquer undercoating against deterioration by the ultra-violet light. Meta diphenyl benzene is the most desirable of the diphenyl benzenes to employ because it is the most easily obtainable at present, whereas the para-diphenyl benzene is the least desirable because of its relative lack of solubility in the usual solvents or solvent mixtures. Ortho diphenyl benzene is, of course, satisfactory. For instance, with about 100 parts of cellulose acetate I may mix approximately 10 parts of diphenyl benzene and 55 parts of benzyl acetate, or 10 parts of diphenyl benzene and 50 parts of glyceryl butyl phthalate, or 10 parts of diphenyl benzene and 50 parts of beta-methoxy ethylphthalate, or 10 parts of diphenyl benzene and 50 parts of benzyl benzoate, or 10 parts of diphenyl benzene and 35 parts of phenyl benzoate. This mixture of these compounds with cellulose acetate may then be dissolved in the above-named solvent mixture in the ratio of about one gallon to each 20 ounces of cellulose acetate employed. Other well known solvents may, of course, be employed in lieu of the solvent combination mentioned. For use with diphenyl benzene I have found such plasticizers as benzyl acetate, glyceryl butyl phthalate, beta methoxy ethyl phthalate, phenyl benzoate and benzyl benzoate, the more satisfactory for the reason that, as above set forth, they do not decompose and discolor the cellulose acetate while diethyl, dibutyl and diamyl phthalate, and many other plasticizers decompose to a greater or lesser extent and thus discolor the cellulose acetate with which they are compounded.

In referring to the diphenyl benzenes above it will be understood that the meta diphenyl benzene is preferred at present because of its now greater availability. The ortho diphenyl benzene is as satisfactory as the meta form but not quite as available. The para diphenyl benzene has excellent filter properties even in amounts as low as .2 to .5 of 1% but has the disadvantage of not being soluble in amounts much above .5 of 1% in the simple solvents. However, I have found that the addition of many of the plasticizers above-named or others will tend to retain an increased percentage of the para compound in solution if such be desired. The description of diphenyl benzenes is, therefore, to be read with these limitations.

Thus it will be apparent that I have provided numerous formulae and an underlying principle for compounding a cellulose acetate lacquer which will not discolor or decompose upon exposure to the elements and which lacquer will also shield or protect a cellulose nitrate solution or lacquer undercoating (over which the cellulose acetate lacquer may be superimposed) from discoloration and deterioration due to exposure to ultra-violet light and other of the elements. It will also be observed that I have provided a novel cellulose acetate lacquer employing a plasticizer or plasticizing mixture which does not discolor the cellulose acetate and which also absorbs those ultra-violet rays which are of such short length as to decompose the cellulose nitrate undercoating. It will also be apparent that I have amply illustrated the principles of my invention by the above numerous examples for carrying it out. Obviously there will occur to others skilled in the art additional compounds which may be employed in the same manner in accordance with the teaching of my invention. All such variations of the invention are, of course, to be included within the spirit of this invention and the scope of the claims appended hereto.

It will be understood that the proportions mentioned above are preferred proportions only and may be varied within certain limits to still accomplish my invention. I am, therefore, not to be restricted to any specific proportions so long as that proportion comes within the principle of my invention as enunciated above.

It is furthermore to be observed that while I have described cellulose acetate as the preferred type of lacquer to be employed as the overcoating, it will be obvious to those skilled in the art that other of the organic esters of cellulose may likewise be employed such, for instance, as cellulose propionate, cellulose butyrate, and other of the organic esters of cellulose derived from fatty acids having from 1 to 6 carbon atoms. It is also possible to employ the principle of my invention with some of the higher organic esters of cellulose such, for instance, as cellulose stearate, cellulose crotonate, and the like, as well as certain of the mixed esters such as cellulose aceto-stearate or cellulose nitro-acetate and the like. These compounds are all well known to those skilled in the art and fully described in prior patents, for instance, to Clarke and Malm and others. It may be said, however, that due to the stability of cellulose acetate and to its retention of a high gloss that it provides the most ideal overcoating for cellulose nitrate lacquer known to me at the present time. While the acetone soluble variety of cellulose acetate is the most suitable to employ it will be quite apparent to those skilled in the art that in some instances the chloroform soluble variety may be used, or even the forms of acetate hydrolyzed beyond acetone solubility may be employed under certain conditions if desired.

While the method of applying these lacquers has not been described in detail it will be apparent that any of the many methods known to those skilled in the art may be employed. The nitrate undercoating may consist of any of the usual cellulose nitrate lacquers now sold to the trade. If an intermediate nitrate coating is to be applied as described in my application Serial No. 444,874, the directions therein given may be followed. I have described herein, in what manner the acetate overcoating may be compounded. The various coatings may be applied by brushing, dipping or spraying as is well known to those skilled in the art.

In the claims appended hereto it will be understood that the term "plasticizing compound" is intended to generically indicate a compound in such a quantity and of such a character as will plasticize the lacquer overcoating. The other limitations in the claims will be apparent.

What I claim as my invention and desire to be secured by Letters Patent of the United States is:

Sept. 11, 1934.  E. A. SPERRY  1,973,545
WAKELESS TORPEDO
Original Filed July 6, 1923  3 Sheets-Sheet 1
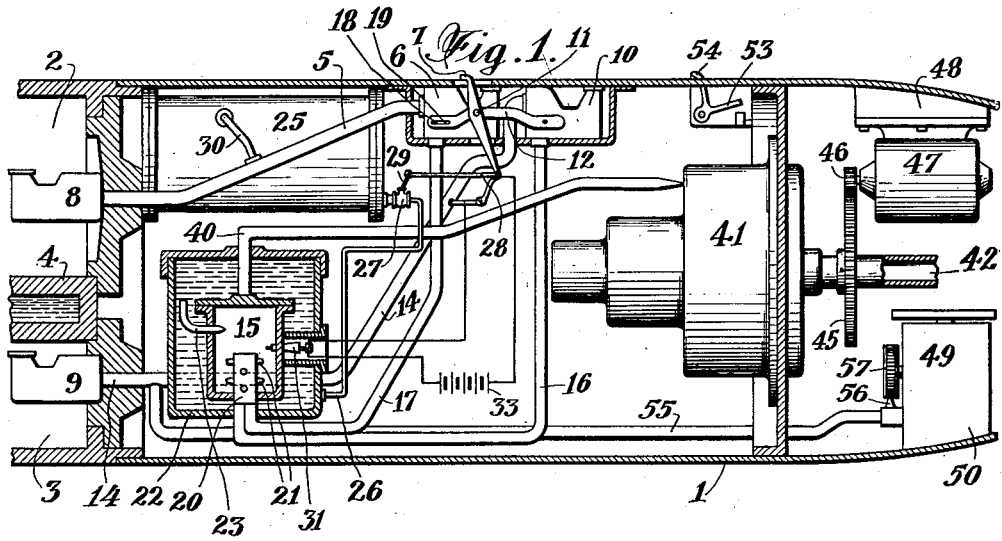
Fig. 1.
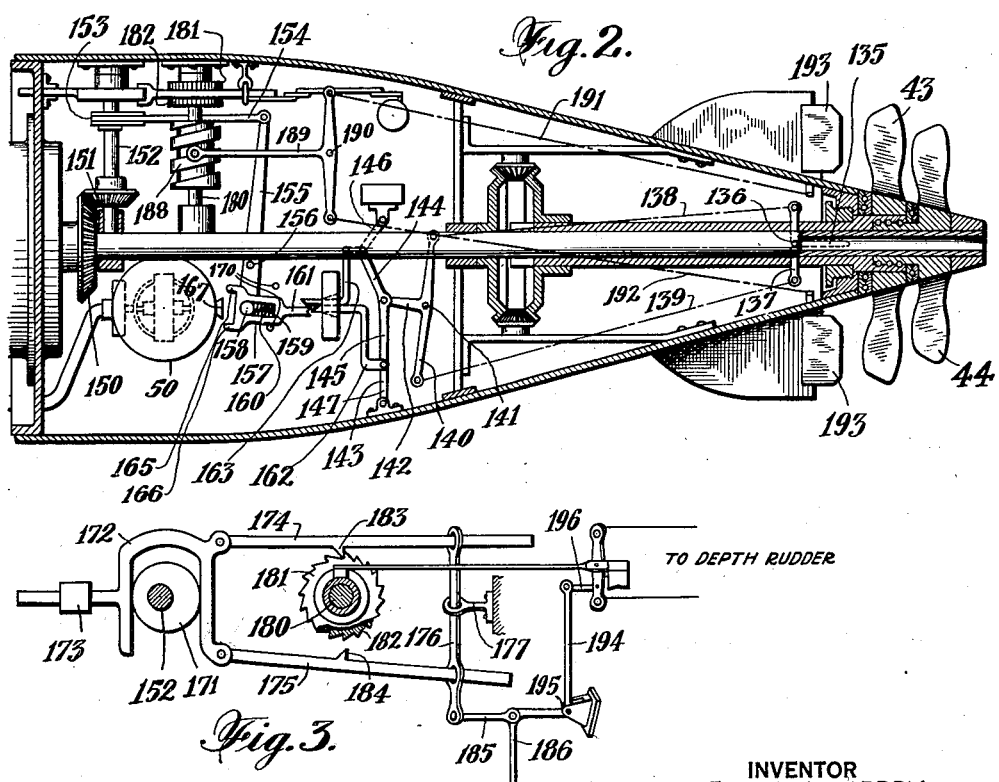
Fig. 2.
Fig. 3.
INVENTOR
ELMER A. SPERRY
EDWARD G. SPERRY, EXECUTOR
BY Joseph H. Lipschutz
ATTORNEY